United States Patent
Viero et al.

(10) Patent No.: US 7,319,713 B2
(45) Date of Patent: Jan. 15, 2008

(54) METHOD OF LIMITING SIGNAL, AND TRANSMITTER

(75) Inventors: Timo Viero, Espoo (FI); Matti Kiiski, Oulunsalo (FI); Olli Väänänen, Espoo (FI); Jouko Vankka, Helsinki (FI)

(73) Assignee: Nokia Corporation, Espoo (FI)

( * ) Notice: Subject to any disclaimer, the term of this patent is extended or adjusted under 35 U.S.C. 154(b) by 775 days.

(21) Appl. No.: 10/726,654

(22) Filed: Dec. 4, 2003

(65) Prior Publication Data

US 2004/0109492 A1    Jun. 10, 2004

Related U.S. Application Data

(63) Continuation of application No. PCT/FI02/00505, filed on Jun. 11, 2002.

(30) Foreign Application Priority Data

Jun. 12, 2001  (FI) .................................. 20011238

(51) Int. Cl.
*H04B 1/00* (2006.01)
(52) U.S. Cl. ..................... 375/135; 375/130; 375/146
(58) Field of Classification Search ............... 375/328, 375/225, 282, 286, 293, 364, 368, 109, 130, 375/135, 146, 295, 312; 370/212, 205, 330, 370/329, 332, 335, 342
See application file for complete search history.

(56) References Cited

U.S. PATENT DOCUMENTS

| | | | |
|---|---|---|---|
| 5,751,705 A * | 5/1998 | Sato | 370/335 |
| 6,144,694 A | 11/2000 | Uta et al. | |
| 6,393,005 B1 * | 5/2002 | Mimura | 370/335 |
| 6,529,560 B1 * | 3/2003 | Creighton | 375/284 |
| 6,590,906 B1 * | 7/2003 | Ishida et al. | 370/480 |
| 6,636,555 B1 * | 10/2003 | Frank et al. | 375/146 |
| 6,922,389 B1 * | 7/2005 | Lundby | 370/209 |
| 6,931,053 B2 * | 8/2005 | McGowan | 375/146 |
| 7,012,969 B2 * | 3/2006 | Ode et al. | 375/296 |
| 7,027,482 B1 * | 4/2006 | Nomura | 375/130 |
| 7,164,931 B2 * | 1/2007 | Ozluturk et al. | 455/522 |

FOREIGN PATENT DOCUMENTS

| | | |
|---|---|---|
| JP | 2000-138655 | 5/2000 |
| WO | WO 00/38351 | 6/2000 |
| WO | WO 00/45538 | 8/2000 |
| WO | WO 01/17107 | 3/2001 |

* cited by examiner

*Primary Examiner*—Mohammed Ghayour
*Assistant Examiner*—Sophia Vlahos
(74) *Attorney, Agent, or Firm*—Squire, Sanders & Dempsey LLP

(57) ABSTRACT

The method comprises setting a threshold value, dividing the combined signal into blocks, comparing the values of each block with the set threshold value and if the threshold value is exceeded, decorrelating the block where the threshold value was exceeded and a pre-determined number of channelization codes, which have a pre-determined spreading factor. The decorrelation result is normalized to determine first weighting coefficients. The method also comprises comparing each combination of a first weighting coefficient and a related channelization code with the set objectives and determining second weighting coefficients for the downlink transmissions selected as a result of the comparison. The examined block is re-formed using combinations of the channelization codes and the weighting coefficients that were determined.

44 Claims, 6 Drawing Sheets

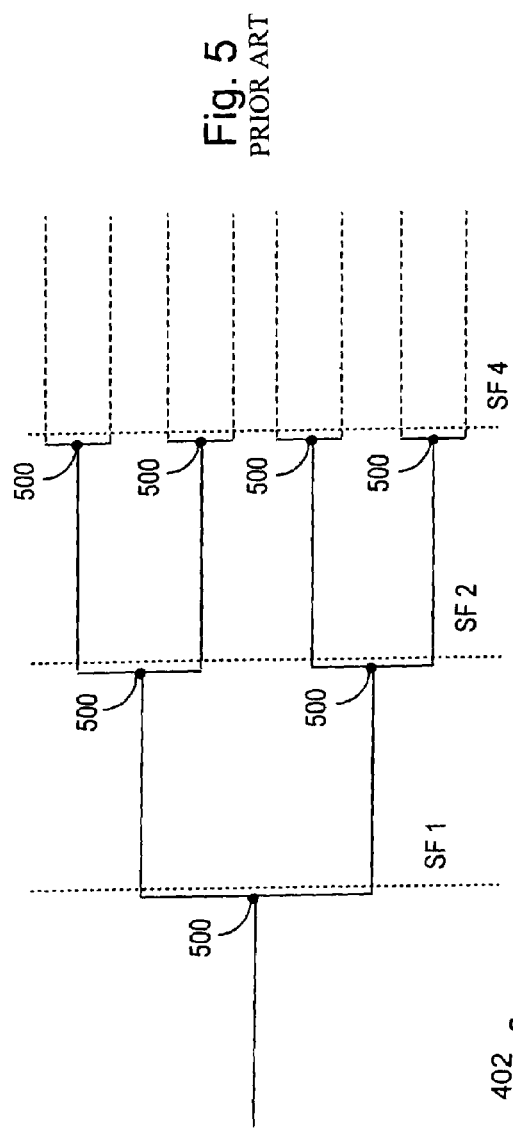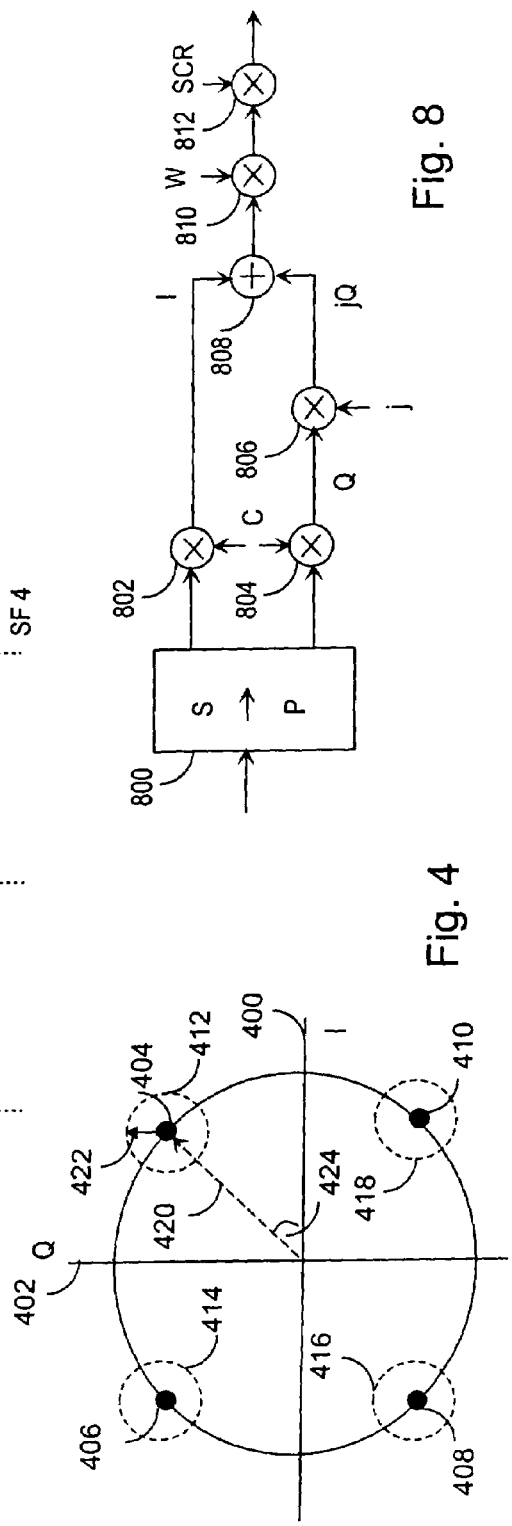

METHOD OF LIMITING SIGNAL, AND TRANSMITTER

This application is a continuation of international application PCT/FI02/00505 filed Jun. 11, 2002 which designated the US and was published under PCT article 21 (2) in English.

FIELD OF THE INVENTION

The invention relates to a method of limiting power or amplitude values of a combined signal in transmitters and receivers of telecommunications systems.

BACKGROUND OF THE INVENTION

In telecommunications systems, particularly in cellular systems, the same radio frequency usually has to be divided between several users. One method of dividing the same transmission frequency between several users is code division multiple access CDMA, where different users are distinguished from one another by multiplying the signal of each user by a separate code, which differs from the other codes and is preferably orthogonal to them so that different transmissions would not correlate with one another on the radio path. In systems based on the code division multiple access, one carrier frequency is modulated by a combined signal which consists of several signals directed to different users. In the existing systems several code groups are available, such as an orthogonal variable spreading factor OVSF used as the channelization code in WCDMA systems (Wide Band Code Division Multiple Access).

The combined signal is amplified to provide it with a suitable transmission power by a power amplifier, which is linear only in a certain power range. This causes problems because the power of the combined signal may momentarily receive values that require a large linear range. Power amplifiers of this kind are difficult to design as well as expensive, for which reason the peak-to-mean ratio (peak-to-average ratio, crest factor) of the signal (or amplitudes) to be amplified has to be limited. Several limiting methods have been devised. These methods are generally called clipping methods. Usually, however, the prior art methods change a combined signal so that the orthogonality of different user-specific codes disappears. In some cases the power or amplitude of outputs cannot in practice be limited because this could hinder successful detection at the receiver of a subscriber terminal. This results from the use of a multilevel modulation method where symbols are so close to one another in the signal space diagram that even a small increase in noise causes an error in detection. In that case clipping should be directed only to the transmissions that can be clipped. Systems that cannot stand clipping include high speed downlink packet access (HSDPA) which has been researched by the 3GPP ($3^{rd}$ Generation Partnership Project) standardization forum. This system employs 16-level or 64-level quadrature amplitude modulation QAM.

BRIEF DESCRIPTION OF THE INVENTION

The object of the invention is to provide an improved method of limiting a signal. This is achieved by a method for limiting a combined signal, the method comprising multiplying an information signal intended for each subscriber terminal by a spreading code and a weighting coefficient, which is proportional to the power of the transmission directed to the subscriber terminal, and combining transmissions directed to several subscriber terminals into a combined signal. The method of the invention comprises setting a threshold value for the power or amplitude values of the combined signal, dividing a chip sequence of the combined signal into blocks, comparing the values of each block with the set threshold value to find out whether the combined signal needs to be limited, and if the threshold value is exceeded, decorrelating the block where the threshold value was exceeded and a pre-determined number of channelization codes, which have a pre-determined spreading factor, and performing normalization to determine first weighting coefficients for the channelization codes or channelization code groups, the first weighting coefficients being proportional to the power of the transmissions directed to pre-determined subscriber terminals, comparing each combination of the first weighting coefficient and the related channelization code with the set objectives and determining second weighting coefficients for the downlink transmission selected as a result of the comparison, the second weighting coefficients being proportional to the power of the transmission directed to pre-determined subscriber terminals, re-forming the examined block using combinations of the channelization codes and the weighting coefficients that were determined, the weighting coefficient being second weighting coefficients, provided they have been determined, or otherwise first weighting coefficients, and thus the examined block of the combined signal becomes limited in respect of the power or amplitude.

The invention also relates to a method for limiting a combined signal, the method comprising multiplying an information signal intended for each subscriber terminal by a spreading code and a weighting coefficient, which is proportional to the power of the transmission directed to the subscriber terminal, and combining transmissions intended for several subscriber terminals into a combined signal. The method of the invention comprises setting a threshold value for the power or amplitude values of the combined signal, dividing a chip sequence of the combined signal into blocks, comparing the values of each block with the set threshold value to find out whether the combined signal needs to be limited, and if the threshold value is exceeded, forming a residual signal, finding channelization codes that are unused at a given time and decorrelating the residual signal and the unused channelization codes to determine weighting coefficients, forming an estimate for the residual signal by means of one or more vectors selected from the sum vectors of the unused channelization codes and weighting coefficients and from the sum vectors corresponding to the unused channelization codes, forming a clipped signal by subtracting the estimate of the residual signal from the combined signal of the examined block, and thus examined block of the residual signal becomes limited in respect of the power or amplitude.

The invention further relates to a transmitter of a radio telecommunications system where a combined signal is limited and an information signal intended for each subscriber terminal is multiplied by a spreading code and a weighting coefficient, which is proportional to the power of the transmission directed to the subscriber terminal and the transmissions intended for several subscriber terminals are combined into a combined signal. The transmitter comprises means for setting a threshold value for the power or amplitude values of the combined signal, means for dividing a chip sequence of the combined signal into blocks, means for comparing the values of each block with the set threshold value to find out whether the combined signal needs to be limited, means for decorrelating the block where the threshold value was exceeded and a pre-determined number of channelization codes, which have a pre-determined spreading factor, and for performing normalization to determine first weighting coefficients for the channelization codes or channelization code groups, the first weighting coefficients being proportional to the power of the transmissions intended for pre-determined subscriber terminals, means for comparing each combination of the first weighting coefficient and the related channelization code with the set objectives and for determining second weighting coefficients for the downlink transmissions selected as a result of the comparison, the second weighting coefficients being proportional to the power of the transmissions intended for pre-determined subscriber terminals, means for re-forming the examined block using combinations of the channelization codes and the weighting coefficients that were determined, the weighting coefficients being second weighting coefficients, provided that they have been defined, or otherwise first coefficients, and thus the examined block of the combined signal becomes limited in respect of the power or amplitude.

The invention further relates to a transmitter of a radio telecommunications system where a combined signal is limited and an information signal intended for each subscriber terminal is multiplied by a spreading code and a weighting coefficient, which is proportional to the power of the transmission intended for the subscriber terminal and the transmissions intended for several subscriber terminals are combined into a combined signal. The transmitter comprises means for setting a threshold value for the power or amplitude values of the combined signal, means for dividing a chip sequence of the combined signal into blocks, means for comparing the values of each block with the set threshold value to find out whether the combined signal needs to be limited, means for forming a residual signal, means for finding the channelization codes that are unused at a given time and decorrelating the residual signal and the unused channelization codes to determine weighting coefficients, means for selecting one or more desired vectors from the sum vectors corresponding to the unused channelization codes, means for forming an estimate of the residual signal using the unused channelization codes and the selected one or more sum vectors, means for forming a clipped signal by subtracting the estimate of the residual signal from the combined signal of the examined block, and thus the examined block of the combined signal becomes limited in respect of the power or amplitude.

The preferred embodiments of the invention are disclosed in the dependent claims.

The invention is based on examining whether the power or amplitude of a combined signal needs to be limited, and if there is need for limitation, the power or amplitude is limited blockwise. The length of the blocks is preferably the same as the pre-selected spreading factor of the channelization cide, e.g. in the WCDMA system the downlink channelization code may have a length of 4, 8, 16, 32, 64, . . . , 512 chips, from which one is selected as the block length.

The method and system of the invention provide several advantages. Since the combined signal is limited on the code level in blocks of several chips, it is easier to retain orthogonality between individual channelization codes. Furthermore, in one embodiment of the method according to the invention clipping can be directed to only those outputs that can be clipped since the detection was successful. Alternatively, if a system with different quality of service classes is used, clipping can be directed only to connections with a lower quality of service. If high speed downlink packet access (HSDPA) is used, one embodiment of the method according to the invention can be used to separate HSDPA signals that are not clipped from other downlink outputs that can be clipped. One modulation method for clipping modulated signals is e.g. quadrature phase shift keying QPSK.

BRIEF DESCRIPTION OF THE FIGURES

The invention will now be described in greater detail by means of preferred embodiments with reference to the accompanying drawings, in which FIG. 4 illustrates the concept of an error vector (EVM), FIG. 5 illustrates an example of a code tree, FIG. 8 illustrates an example of the structure of a spreading and weighting block.

DESCRIPTION OF EMBODIMENTS

The solution of the invention is particularly applicable to a WCDMA radio system (Wideband Code Division Multiple Access), which employs the direct sequence DS technique. Other applications include satellite systems, military telecommunications systems and private non-cellular networks. The solution of the invention is not, however, limited to these examples.

The following example illustrates preferred embodiments of the invention in a UMTS system (Universal Mobile Telephone System) without limiting the invention thereto.

Figure 1:
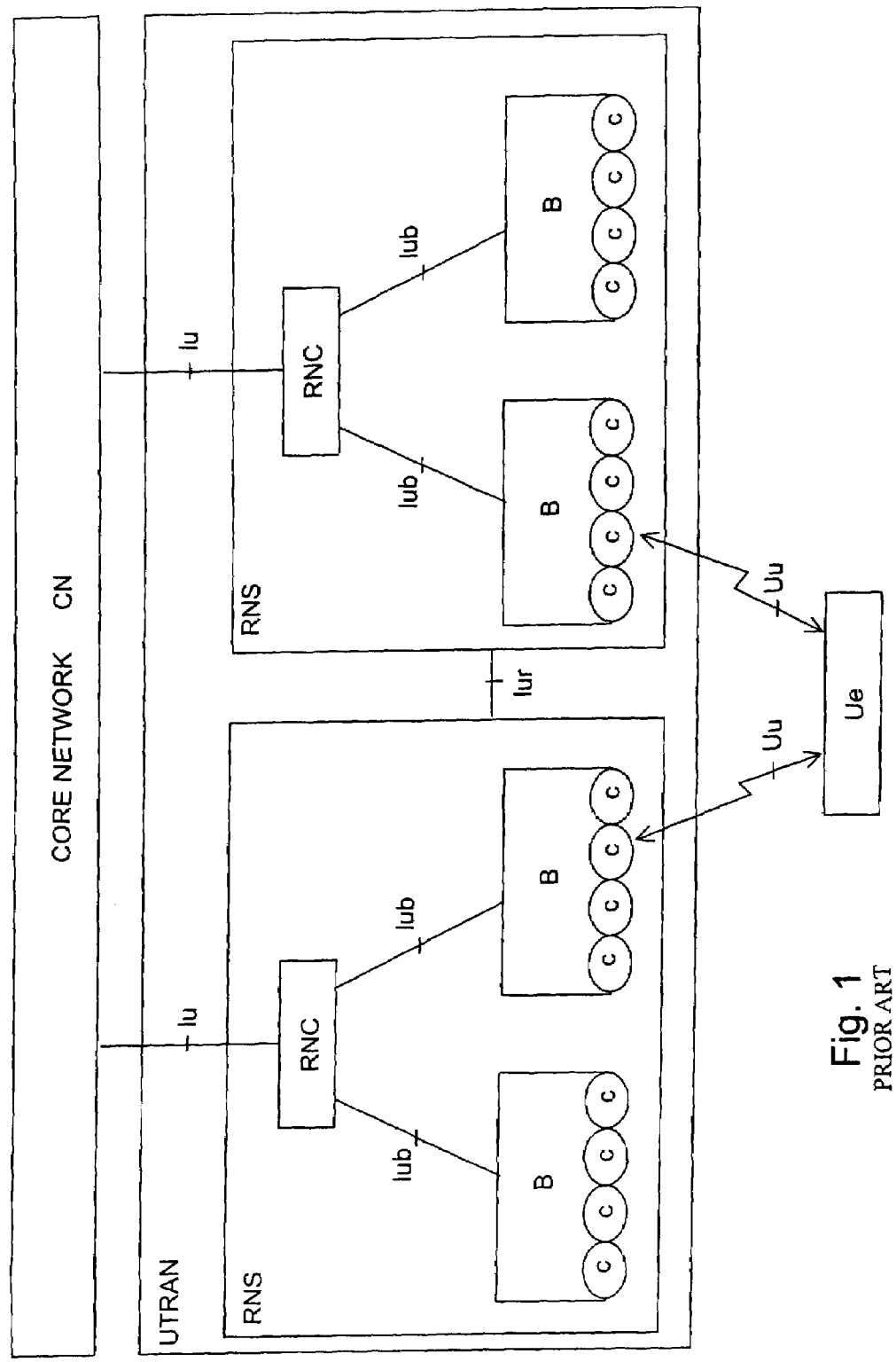
FIG. 1 shows one example of a telecommunications system.

The structure of a mobile communications system will be exemplified referring to FIG. 1. The main parts of the mobile communications system are a core network CN, a UMTS terrestrial radio access network UTRAN and user equipment Ue. The interface between the CN and the UTRAN is called Iu and the air interface between the UT RAN and the Ue is known as Uu.

The UTRAN consists of radio network subsystems RNS. The interface between the radio network subsystems RNS is called Iur. The RNS consists of radio network controllers RNC and one or more node Bs. The interface between the RNC and the B is called Iub. The coverage area of the node B, i.e. a cell, is denoted by C in the figure.

Figure 2:
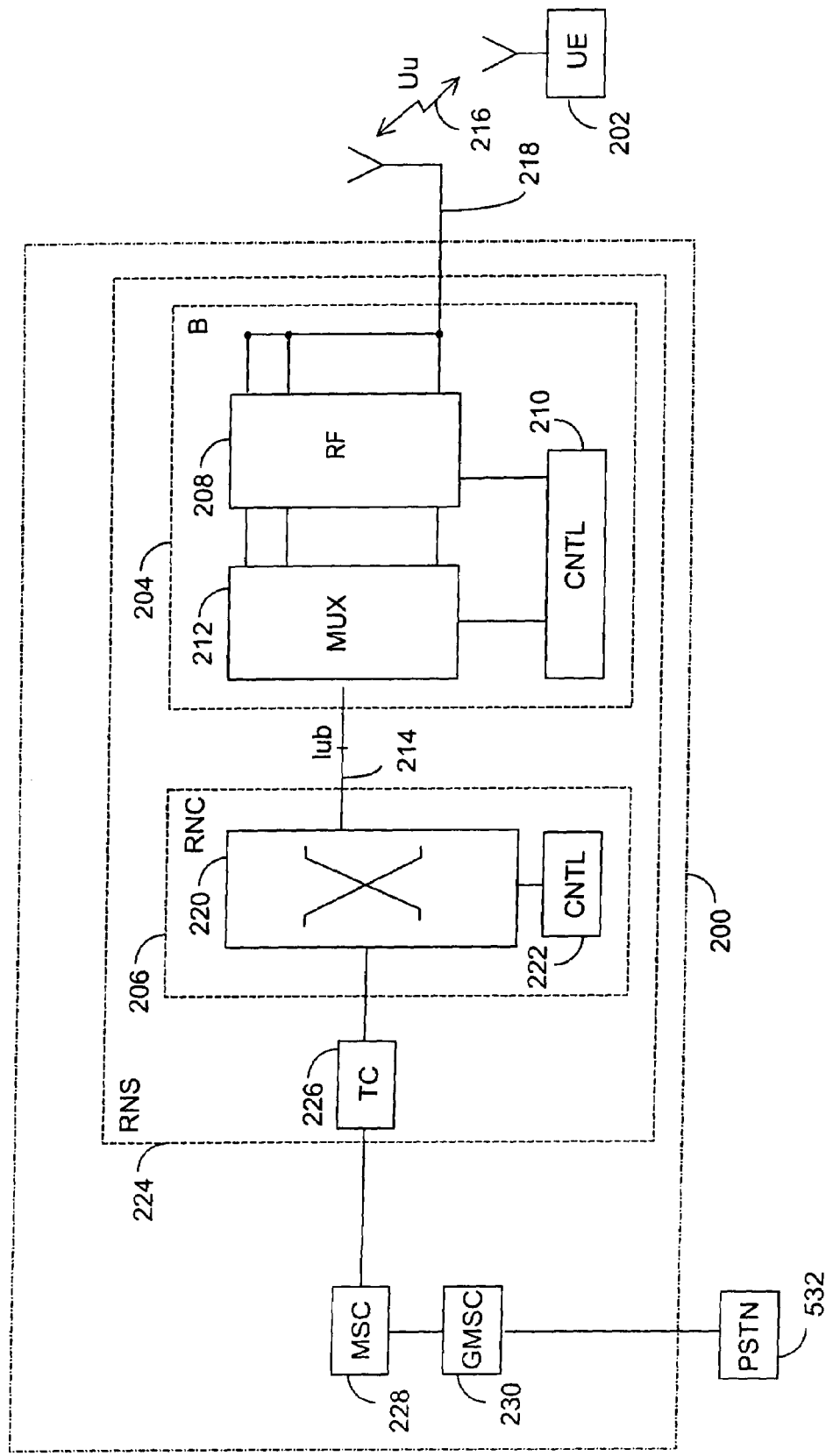
FIG. 2 shows a second example of a telecommunications system.

The description shown in FIG. 1 is rather general and therefore a more detailed example of a cellular radio system is given in FIG. 2. FIG. 2 includes only the most essential blocks but it is clear to a person skilled in the art that a conventional cellular radio system also comprises other functions and structures which need not be explained more closely here. The details of the cellular radio system may be different from those shown in FIG. 2 but these differences are not relevant to the invention.

The cellular radio network typically comprises the infrastructure of a fixed network, i.e. a network part 200 and subscriber terminals 202, which may be fixed, placed in a vehicle or portable terminals, e.g. mobile phones or laptops, which enable communication with a radio telecommunications system. The network part 200 includes base stations 204. The base station corresponds to the node B in the preceding figure. Several base stations 204 are controlled centrally by a radio network controller 206 which communicates with the base stations. The base station 204 includes transceivers 208 and a multiplexer unit 212.

The base station 204 further includes a control unit 210, which controls the function of the transceivers 208 and the multiplexer 212. The multiplexer 212 is used for arranging the traffic and control channels used by several transceivers 208 onto one transmission connection 214. The transmission connection 214 forms an interface called Iub.

From the transceivers 208 of the base station 204 there is a connection to an antenna unit 218, which establishes a radio connection 216 to the subscriber terminal 202. The structure of the frames to be transmitted over the radio connection 216 is system-specific and called a Uu air interface.

The radio network controller 206 comprises a group switching field 220 and a control unit 222. The group switching field 220 is used for switching speech and data and for connecting signalling circuits. The radio network subsystem 224 formed by the base station 204 and the radio network controller 206 also includes a transcoder 226. The transcoder 226 is usually located as close to a mobile services switching centre 228 as possible because this way transmission capacity can be saved when speech is transferred in the format of the cellular radio network between the transcoder 226 and the radio network controller 206.

The transcoder 226 converts the different digital speech endoding formats used between the public switched telephone network and the radio telephone network into compatible formats, e.g. from the format of the fixed network into a format of the cellular radio network or vice versa. The control unit 222 performs call control, mobility management, collection of statistical information and signalling.

FIG. 2 further shows a mobile services switching centre 228 and a gateway mobile services switching centre, which is responsible for the connections of the mobile communication system to external networks, in this case to the public switched telephone network 232.

In the following, method steps according to a first embodiment of the invention for limiting the power or amplitude level in a transmitter when the chip sequence of a combined signal is divided into blocks will be described by means of FIG. 3. The method comprises multiplying the information signal intended for each terminal by a spreading code and a weighting coefficient, which is proportional to the power of the transmission intended for the subscriber terminal. The method also comprises combining transmissions intended for several different subscriber terminals into a combined signal. The method starts in block 300. In block 302 a threshold value is set for the power or amplitude values of the combined signal, i.e. combination of several signals that are to be transmitted on the same carrier wave. The parts of the signals that exceed the threshold value are clipped. The properties of the power amplifier used and the desired peak-to-mean ratio of power (peak-to-average ratio, crest factor) are typically taken into account in the determination of the threshold value. In the design of the clipping algorithm and the whole radio transmitter it is necessary to consider the requirements of the data transmission system, such as the allowed bandwidth and stop band attenuation, i.e. the width of the signal's frequency band, so that the signal would extend to other frequency bands within the allowed limits, the required transmission power and the allowed maximum value of the error vector magnitude EVM or the maximum value of the peak code domain error, which is used in WCDMA systems and describes the error caused by modulation inaccuracy in the combined signal. Other factors can also be taken into account when the threshold value is set.

In the following, the determination of the error vector magnitude will be described by means of FIG. 4. FIG. 4 illustrates a simple example of a signal space diagram, which can be used to illustrate how modulated symbols are located with respect to one another. The example describes a two-dimensional signal space diagram of a phase-modulated signal when modulation comprises four constellation points or states. In that case four different signals or pulse forms are used. In the example of FIG. 4 points 404, 406, 408, 410 describe different signals, i.e. states of the signal space diagram. The signal receives a different phase difference in the different states 404, 406, 408, 410 of the signal space diagram. The number of states in the signal space diagram varies depending on the modulation method: the larger the number of states, the higher the data transmission capacity of the system. The signal space diagram can be presented as a single circle as in FIG. 4 but there are also other ways of presentation. In the figure the horizontal axis 400 represents the phase component of a modulated signal and the vertical axis 402 the quadrature component. Circles 412, 414, 416, 418 describe the area where the signals representing different symbols really are due to various instances of interference. There are also signal values between the constellation points. The sampling moment is determined by taking samples at moments when the signal is at the constellation point as accurately as possible.

The signal phase diagram is formed by placing the indicator figures of different signals with certain phase differences in the same figure. Only one indicator FIG. 420 illustrating the amplitude of one signal is shown in FIG. 4. Angle 424 describes the phase difference of the signal. For the signal this indicator figure is $A \cos(2\pi f_0 t + \phi)$ where A is the signal amplitude, $f_0$ is the average frequency, t is the time and $\phi$ is the phase difference.

Arrow 422 denotes a vector which represents the distance between the location of an interference-free symbol and the real location of the symbol when interference has been added to the modulated signal. This vector is called error vector magnitude (EVM). The error vector is one prior art indicator for quality of modulation.

Next in block 304 the chip sequence of the combined signal, i.e. the symbol sequence multiplied by the channelization code, is divided into blocks. In WCDMA systems the length of a chip block is preferably the same as the spreading factor SF of the pre-selected channelization code; for example, if the spreading factor is four, the length of the chip block is four chips. One channelization code corresponds to one or more downlink transmissions depending on the block length and the transmission symbol rate used.

In block 306 the power or amplitude of each chip block is compared with the threshold value set in block 302 to find any values that are greater than the threshold value. This allows to find out whether the combined signal needs to be clipped. If the threshold was exceeded, the block where the threshold value was exceeded and a pre-determined number of channelization codes are decorrelated in block 308. Decorrelation is preferably performed by calculating the input of the vectors by means of the block where the threshold value was exceeded and a pre-determined number of channelization codes. The channelization codes are selected so that they have a pre-determined spreading factor which is the same as the block length. The decorrelation result is normalized, i.e. divided by the selected spreading factor of the channelization code. First weighting coefficients can be determined for the channelization codes of the combined signal by means of decorrelation and normalization. The first weighting coefficients are proportional to the power of the transmission intended for pre-determined subscriber terminals, i.e. when the coefficient changes, the power of the transmission intended for the subscriber terminal also changes. The higher the weighting coefficient, the higher the transmission power. The weighting coefficients can be determined codewise if the block is sufficiently long, i.e. a more accurate picture of the downlink transmissions is obtained by increasing the block length. In practice, however, the block length needs to be usually limited because the delay increases with the block length. Thus in several cases the weighting coefficients can be determined code group by code group, i.e. according to the sub-code tree. If the threshold was not exceeded, the following block will be examined.

In the following, an example of the structure of a prior art code tree will be described by means of FIG. 5. The code tree shown in FIG. 5 is used in WCDMA systems. Each point 500 represents one feasible channelization code. The vertical broken lines describe different spreading factors: SF=1, SF=2, SF=4, SF=8, SF=16, SF=32, SF=64, SF=128, SF=256, SF=512. The codes on each vertical broken line are orthogonal to one another. The code tree on the right-hand side of each channelization code, i.e. point 500 in the figure, forms a sub-code tree with two branches: a left-hand branch and a right-hand branch. The codes of different sub-tree branches are orthogonal to one another. In practice, the maximum number of different simultaneous channelization codes that are orthogonal to one another could be 512 in WCDMA systems. For example, the code corresponding to the spreading factor SF=1 is (1). The spreading factor SF=2 has two codes (1,1) and (1,−1) that are orthogonal to each other. Furthermore, the spreading factor SF=4 has four codes that are orthogonal to one another: codes (1,1,1,1) and (1,1,−1,−1) below the upper-level code (1, 1) and codes (1,−1,1,−1) and (1,−1,−1,1) below the second upper-level code (1,−1). The formation of codes proceeds this way towards the lower levels in the code tree. Codes of a certain level are always orthogonal to one another. Likewise a code on a certain level is orthogonal to another code on the same level and to all next-level codes derived from it. In this application the code groups refer to codes belonging to the same sub-code tree.

In block 310 each combination of a first weighting coefficient and a related channelization code determined in block 308 is compared with the set objectives. Each combination determines the power of transmission directed to one or more subscriber terminals. The set objective is to reduce the peak-to-mean ratio within a block, i.e. cutting of the power or amplitude value which exceeds the threshold value to the threshold level. At the same time the distortion caused by the combined signal of the selected clipping algorithm is to be minimized so as not to exceed the limits of the maximum value of the peak code domain error and error vector magnitude EVM in accordance with the standard of the telecommunications system used. Furthermore, it is advisable to keep the channelization codes orthogonal because this allows minimization of the interference that the signals multiplied by different channelization codes cause to one another. If the comparison shows that there is need to change one or more of the weighting coefficients determined in block 308 to achieve the above-mentioned objectives, one or more second weighting coefficients are determined for the selected downlink transmissions. The second weighting coefficients are also proportional to the transmission power:
the higher the weighting coefficient, the higher the transmission power. The second weighting coefficients can be defined for all channelization codes or code groups or only for a desired part of them.

In block 312 the examined block is re-formed using combinations of channelization codes and weighting coefficients that were determined. The weighting coefficients are second weighting coefficients, provided that they have been determined; otherwise they are first weighting coefficients, in which case the examined block of the combined signal becomes limited in respect of the power or amplitude. Typically combining is performed by multiplying each channelization code by its weighting coefficient, after which a desired number of signals multiplied by the codes are added up.

In the following, an example of limiting a signal blockwise will be described by means of Table 1. The example has been simplified for the sake of clarity. In clipping the block length is four chips and the example illustrates clipping of two successive blocks.

TABLE 1

| Spreading factor/subscriber terminal | weighting coefficient | channelization code |
|---|---|---|
| SF 4 (terminal 1) | 6 ja 6 | 1 1 1 1 |
| SF 8 (terminal 2) | 7 | 1 −1 1 −1 −1 1 −1 1 |
| SF 8 (terminal 3) | 3 | 1 1 −1 −1 −1 −1 1 1 |
| SF 8 (terminal 4) | 10 | 1 1 −1 −1 1 1 −1 −1 |

In the table the first column includes the spreading factor SF of the channelization code used. One encoded transmission is directed to each subscriber terminal, e.g. subscriber terminal 1. The next column includes the first weighting coefficients and the last column an output-specific channelization code. A sum signal is obtained by adding up the signals that have been multiplied by the weighting coefficients, i.e. we obtain 26, 12, 0, −14, 6, 20, −8, 6 (e.g. 6*1+7*1+3*1+10*1=26). The code with spreading factor 4 is repeated (weighting coefficient 6 both for the first and the second block) and the code sequence will thus have the same length as the codes with spreading factor 8. The signal 26, 12, 0, −14, 6, 20, −8, 6 is sent to clipping. The first four-chip block is 26, 12, 0, −14 and the second one 6, 20, −8, 6. 20 is set as the threshold value, which means that the greatest power value 26 is clipped. Then the channelization codes and the selected block are decorrelated, i.e. the input is calculated. The decorrelation result is normalized, i.e. divided by the spreading factor, which is 4 in the example, which yields weighting coefficients 6, 13, 7, 0.

In the exemplified situation a decision is made to clip the transmission directed to subscriber terminal 2 by spreading factor 8 to change weighting coefficient 7 into 1. The transmission to be clipped can also be any other transmission and the value for the weighting coefficient can be selected differently. The chipped block is 20, 18, −6, −8. It is noticed that in the block the signal of only one code channel has been clipped and the orthogonality between the different codes has been retained. In the latter four-chip block the threshold value 20 is not exceeded and thus no clipping is performed.

The method ends in block 318. The method can be repeated in various ways. Arrow 314 describes repetition of the method blockwise and arrow 316 describes repetition of the method starting from setting of the threshold value.

The clipping method described above is preferably performed on the I/Q level, in which case any scrambling has to be eliminated or clipping has to be performed before multiplication by the spreading code. Any other signals in the combined signal that are non-orthogonal to the transmissions of the subscriber terminal are also deleted from the combined signal before clipping, or clipping is performed before these signals are added. It should be noted that the deleted signals are taken into account when the threshold value is set. In that case I components and Q components can be processed separately when a combined signal is formed by adding I components and Q components with their separate adders. Clipping can change both the signal amplitude and the phase or only the signal amplitude. It should be noted that one or a few unclipped signals can be added to a clipped combined signal.

Next we will describe method steps according to a second embodiment for limiting the power or amplitude level in a transmitter when a chip sequence of the combined signal is divided into blocks. The method comprises multiplying the information signal intended for each subscriber terminal by a spreading code and a weighting coefficient, which is proportional to the power of the transmission directed to the subscriber terminal, and combining transmissions directed to several subscriber terminals into a combined signal. The method starts in block 600. In block 602 a threshold value is set for the power and amplitude values of the combined signal, i.e. a combination of several signals to be transmitted on the same carrier wave. The power or amplitude values that exceed the threshold value are clipped. Setting of the threshold value was described in greater detail in connection with FIG. 3.

In block 604 the chip sequence of the combined signal, i.e. the symbol sequence multiplied by the spreading code, is divided into blocks. In WCDMA systems the chip block length is preferably the same as the spreading factor SF of the channelization codes used; for example, if the spreading factor is four, the chip block length is four.

In block 606 the power or amplitude values of each chip block are compared with the threshold value set in block 602 to find any values that are greater than the threshold value. This way it can be found out whether the combined signal needs to be clipped.

Next in block 608 a residual signal is formed for each chip of the block. The residual signal can be formed in a number of different ways. The residual signal preferably includes the signal part that exceeds the threshold value. The residual signal is formed by defining a residual value for each chip of the block as follows: if the chip value is greater than the threshold value, the threshold value is subtracted from the chip and the result of this subtraction is the residual value. If the absolute value of the chip at most equals the threshold value, the residual value is zero. If the chip value is lower than the negation of the threshold value, the threshold value is added to the chip value and the result of this addition is the residual value. Thus the residual value is determined for each chip of the block under examination as follows:

$$r = \begin{cases} x - t, & x > t \\ 0, & |x| \le t \\ x + t, & x < -t, \text{ where} \end{cases} \quad (1)$$

x means the chip, t=the threshold value r=the residual signal.

Alternatively, the residual signal can be determined for each chip of the block as follows:

$$r = \begin{cases} x - a, & x \ge 0 \\ x + a, & x < 0, \text{ where} \end{cases} \quad (2)$$

x means the chip a=the standard deviation of the combined signal, r=the residual signal.

In other words, the residual signal is formed by determining a residual value for each chip of the block as follows: if the chip value is at least zero, the standard deviation of the combined signal is subtracted from the chip value and the result of this subtraction is the residual value; if the chip value is lower than zero, the standard deviation of the combined signal is added to the chip value and the result of this addition is the residual value.

In block 610 channelization codes that are unused at a given time are searched for. The unused channelization codes are preferably searched for by decorrelating a block of the combined signal and the corresponding channelization codes and by normalizing the decorrelation result by dividing it by the length of the channelization code, which is equal to the block length. Decorrelation is preferably performed by calculating the vector inputs. The codes with a weighting coefficient which is zero or close to it are unused channelization codes. This is followed by decorrelating the residual signal defined for the block under examination in block 608 by each unused channelization code. This way the weighting coefficients corresponding to the unused channelization codes can be determined.

In block 612 an estimate of the residual signal is formed using the unused channelization codes, the weighting coefficients and the one or more selected sum vectors. The sum vectors correspond to each unused channelization code. All elements of the selected sum vector are preferably zeroes, in which case the signal is orthogonal. The residual signal estimate is formed by multiplying each unused channelization code by a corresponding weighting coefficient, which yields an input vector, and by adding the selected sum vector to the input vector obtained, which yields a partial estimate vector, after which the partial estimate vectors obtained are added up. If all sum vectors are zeroes, the estimate of the residual signal is orthogonal to the combined signal, i.e. to the signals to be transmitted to the terminals. Otherwise the estimate of the residual signal correlates with the combined signal because the residual signal is unorthogonal to the combined signal. If the difference between the combined signal and the residual signal still exceeds the set threshold value, a vector with one or more elements which deviate from zero can be selected as the sum vector or one or more elements can be set as different from zero. The deviation from the othrogonality of the signal should be as small as possible even if the estimate of the residual signal had to be changed.

In block 614 a clipped signal is formed by subtracting the estimate of the residual signal from the combined signal of the examined block and thus the examined block of the combined signal becomes limited in respect of the power or amplitude.

In the following, an example of how signals are limited blockwise by adding codes, i.e. according to the second embodiment, will be described by means of Table 1. The example has been simplified for the sake of clarity. Table 1 was used above in connection with the description of the first embodiment of the invention. In clipping the block length is four chips and the example illustrates clipping of two successive blocks.

A sum signal is obtained by adding up the signals multiplied by the weighting coefficients, which yields signals 26, 12, 0, −14, 6, 20, −8, 6 (e.g. 6*1+7*1+3*1+10*1=26). The channelization code whose spreading factor (SF) is four is repeated and thus the code sequence will have the same length as the codes whose spreading factor is eight. The signal 26, 12, 0, −14, 6, 20, −8, 6 is sent to clipping. The first four-chip block is 26, 12, 0, −14 and the second one 6, 20, −8, 6. 20 has been selected as the threshold value. Since value 26 of the first block exceeds the threshold value, the block is decorrelated by all channelization codes 1111, 11−1−1, 1−11−1, 1−1−11 whose length equals to the block length and divided by the spreading factor, which is four in this example. This yields weighting coefficients 6, 13, 7, 0. Code 1−1−11 is unused and the other ones are used codes. A residual signal is calculated for the first block by the method according to formula (1), which yields as the residual signal 6, 0, 0, 0. The calculated residual signal is decorrelated by the unused code 1−1−11, which yields weighting coefficient 6, which is 6/4 after normalization. The estimate of the residual signal is thus 6/4, −6/4, −6/4, 6/4 when the sum vector corresponding to code 1−1−11 has been set as zero. When the estimate of the residual signal is subtracted from the combined signal, a clipped signal 24½, 13½, 1½, −15½ is obtained. Alternatively, the sum vector can be e.g. signal 1, 0, 0, 0, which yields estimate 10/4, −6/4, −6/4, 6/4, in which case the clipped combined signal is 23½, 13½, 1½, −15½. The second block 6, 20, −8, 6 does not include values exceeding the threshold value, and consequently it will not be clipped.

The method ends in block 620. The method can be repeated in various ways. Arrow 616 illustrates repetition of the method chip block by chip block. Arrow 618 illustrates repetition of the method starting from setting of the threshold value.

The clipping method explained above is preferably performed on the I/Q level, in which case any scrambling is eliminated or the clipping is performed before that. Any other signals in the combined signal that are non-orthogonal to the transmissions of the subscriber terminal are also deleted from the combined signal before clipping, or clipping is performed before these signals are added. It should be noted that the deleted signals are taken into account when the threshold value is set. In that case I components and Q components can be processed separately when a combined signal is formed by adding I components and Q components with their separate adders, i.e. there are two adders. In that case the I components and the Q components are not combined into one signal until after clipping. Clipping can change both the signal amplitude and the phase or only the signal amplitude. It should be noted that one or a few unclipped signals can be added to a clipped combined signal.

Figure 7:
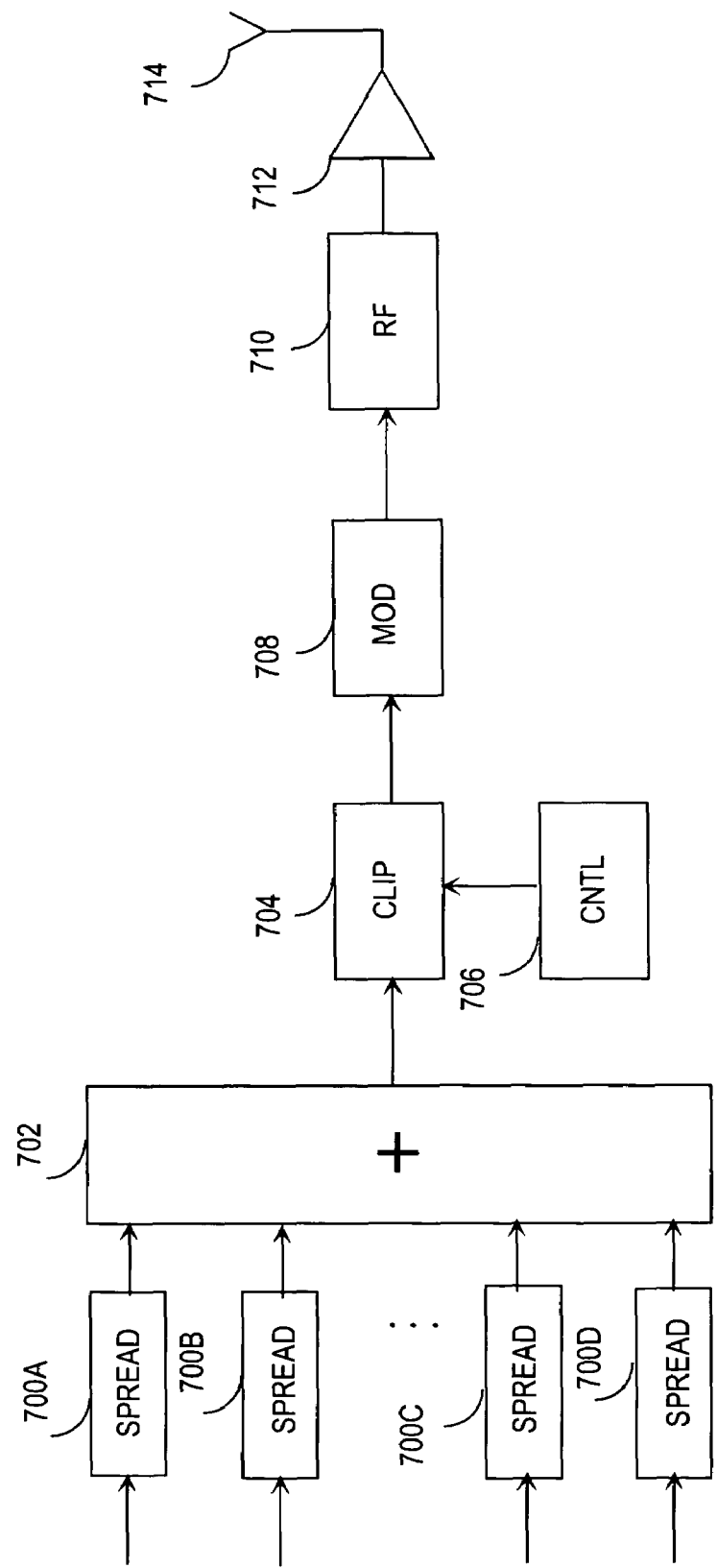
FIG. 7 illustrates an example of a transmitter.

An example of a transmitter structure where a signal can be limited blockwise will be explained with reference to FIG. 7. It is obvious to a person skilled in the art that the transmitter structure may be different from the one shown in FIG. 7. Functional blocks 700A to D multiply the signals to be transmitted by a spreading code and a weighting coefficient. Each functional block 700A to D receives a data signal, i.e. an information sequence that has been processed differently, intended for one subscriber terminal. Signal processing of the information sequence, including channel encoding and interleaving, is usually implemented in a DSP processor (Digital Signal Processing), which is not shown in FIG. 7.

The function of blocks 700A to D will be described in greater detail by means of FIG. 8. FIG. 8 is a block diagram showing an example of the structure of one functional block. It is obvious to a person skilled in the art that the structure of a functional block may differ from the one shown in FIG. 8. A data flow processed in various ways arrives at a serial-to-parallel converter, which divides the symbols of the data flow into I and Q branches. The I branch is an in-phase component branch and the Q branch is a quadrature branch. The symbols are usually divided by guiding even symbols to the I branch and odd symbols to the Q branch. The symbols of the I and Q branches are multiplied by coefficients 802, 804 of the selected channelization code. After this, the chips of the Q branch are converted into complex values by 90° phase shift, after which the chips of different branches are added up to a sum signal I+jQ. The signal intended for one subscriber terminal is weighted by a weighting coefficient 810, which is proportional to the transmission power of the output. Finally the signal is multiplied by the weighting coefficient 812 of the scrambling code. Then the signal is supplied to an adding block 702 of the transmitter where the signals of one user are added up to a combined signal. The adding process can also be implemented in phases, i.e. first a desired number of the modulator outputs of one carrier wave are added up, after which the intermediate results are added up to obtain the final sum signal. For example, if one carrier wave has eight modulators, four signals can be added up first, after which the intermediate results are added up. There can also be more than two successive addition phases. This embodiment may be advantageous when one carrier wave has several modulators. The number of blocks 700A to D may vary depending on the application, mainly on the number of users. Thus there may be more or fewer blocks than in FIG. 7.

Figure 3:
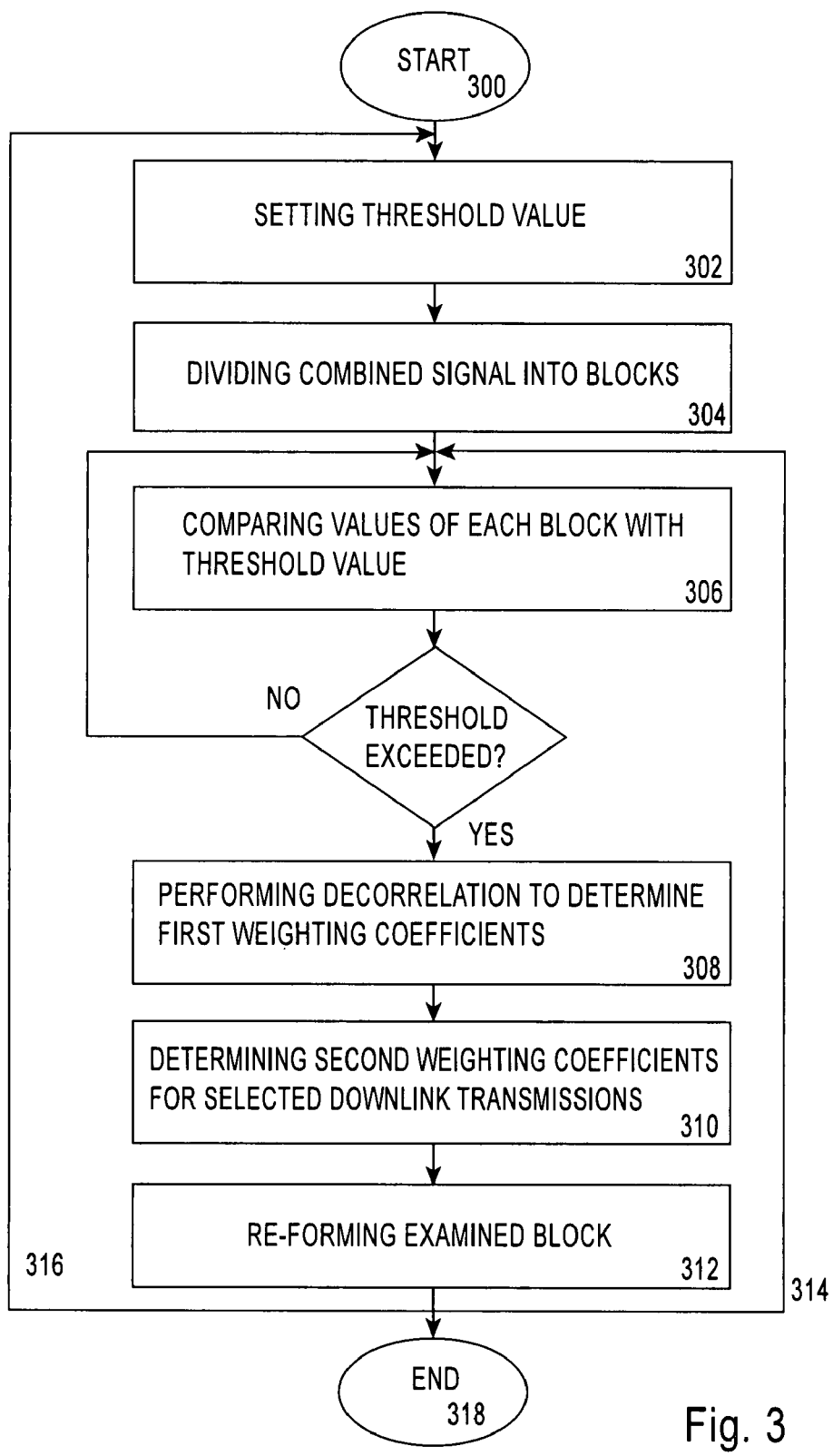
FIG. 3 is a flow chart illustrating first method steps for limiting a combined signal.
Figure 6:
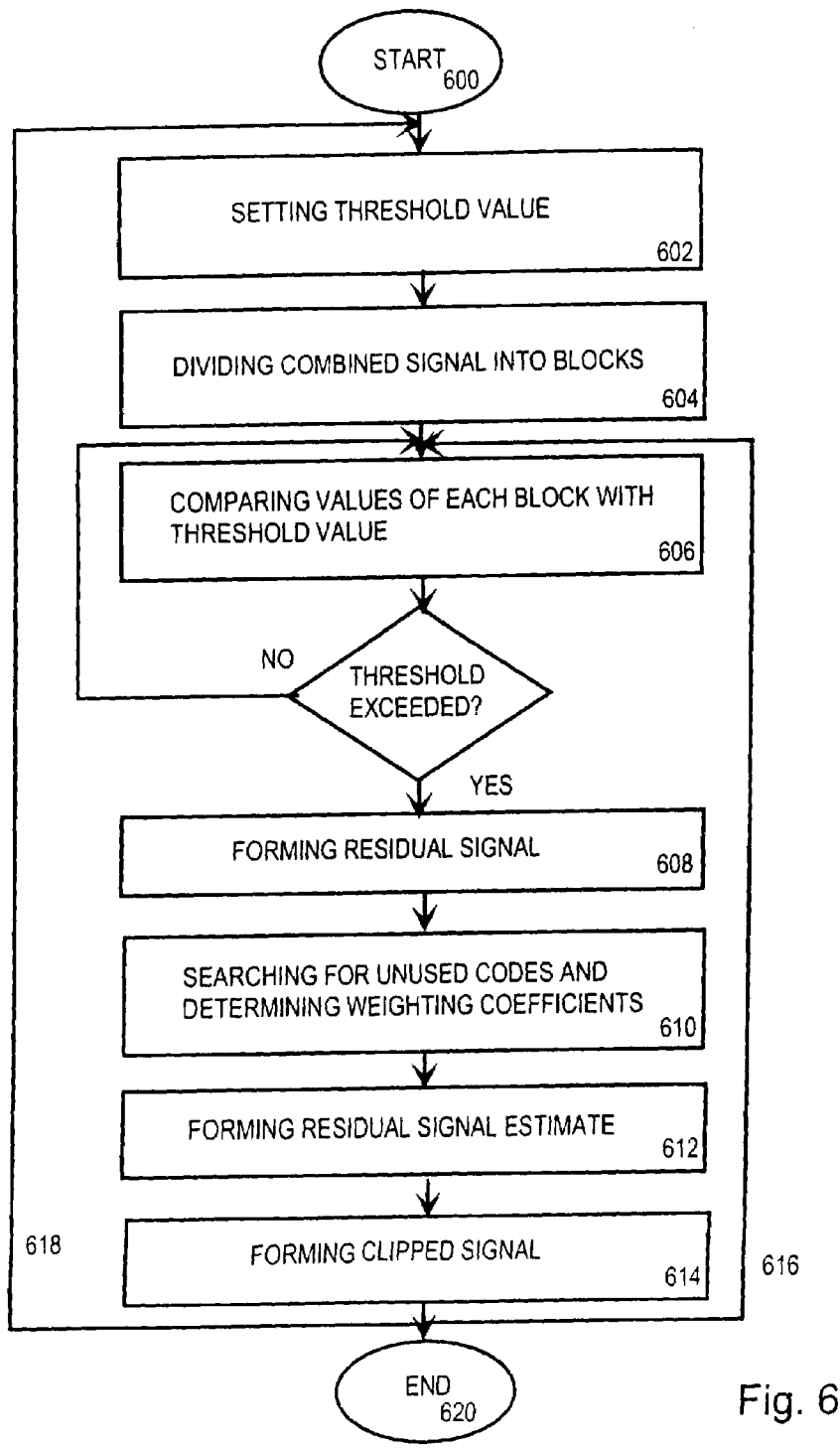
FIG. 6 is a flow chart illustrating an example of second method steps for limiting a combined signal.

Next the combined signal is supplied to a clipping block 704, where weighting coefficients are determined for the combined signal in accordance with the description of FIG. 3 or 6. FIG. 3 describes the first embodiment of the method according to the invention and FIG. 6 the second one. The clipping block may be followed by a pulse processing filter and interpolation, which are not shown in the figure.

Signals that are transmitted on the same carrier wave are added up in block 702. The result is a combined signal which comprises a number of signals of one user. This number varies depending on the application. Block 706 is a control block which controls the function of the clipping block, e.g. sets the threshold value or gives a command to define/determine second weighting coefficients. If clipping is performed on the I/Q level, scrambling is eliminated or clipping is performed before that. Any other signals in the combined signal that are non-orthogonal to the transmissions of the subscriber terminal are also deleted from the combined signal before clipping, or clipping is performed before these signals are added. It should be noted that the deleted signals are taken into account when the threshold value is set. The I and Q components can be processed separately when a combined signal is formed by adding I components and Q components with their separate adders, i.e. there are two adders. In that case the I components and the Q components are not combined into one signal until after clipping. Clipping can change both the amplitude and the phase of the signal or only the signal amplitude.

Modulation where the combined signal modulates the carrier wave according to the selected modulation method is performed in block 708. The modulation methods are well known in the art and will not be described in greater detail here. In the modulation block the signal is also converted from the digital format into the analogue format by a D/A converter.

In RF parts 710 the signal is upconverted to the selected transmission frequency and filtered, if necessary. The power amplifier 712 amplifies the signal to the transmission power level. If the transmitter and the receiver use the same antenna, a duplex filter is also needed to separate the signal to be transmitted from the signal to be received. The antenna 714 may be a single antenna or a group antenna consisting of one or more antenna elements.

The invention is implemented e.g. by software, in which case the base station 204 includes a microprocessor where the functions according to the method described are implemented by software. The invention can also be implemented by hardware solutions, for example, which provide the required functionality, such as ASIC (Application Specific Integrated Circuit), or using separate logic components.

Even though the invention was described referring to an example according to the enclosed drawings, it is clear that the invention is not restricted thereto but it can be modified in various ways within the inventive concept disclosed in the appended claims.

The invention claimed is:

1. A method of limiting a combined signal, the method comprising:
    multiplying an information signal intended for each subscriber terminal by a spreading code and a weighting coefficient, which is proportional to the power of the transmission directed to the subscriber terminal;
    combining transmissions intended for various subscriber terminals into a combined signal;
    setting a threshold value for power or amplitude values of the combined signal;
    dividing a chip sequence of the combined signal into blocks;
    comparing the power or amplitude values of each block with the set threshold value to find out whether the combined signal needs to be limited; and
    when the threshold value is exceeded,
        decorrelating the block where the threshold value was exceeded and a pre-determined number of channelization codes, which have a pre-determined spreading factor, and performing normalization to determine first weighting coefficients for the channelization codes or channelization code groups, the first weighting coefficients being proportional to the power of transmissions directed to pre-determined subscriber terminals;
        comparing each combination of the first weighting coefficient and the related channelization code with set objectives and determining second weighting coefficients for downlink transmissions selected as a result of the comparison, the second weighing coefficients being proportional to the power of transmissions directed to pre-determined subscriber terminals; and
        re-forming the block using combinations of the channelization codes and the weighting coefficients that were determined, the weighting coefficients being second weighting coefficients provided that they have been determined, or otherwise first weighting coefficients, and thus the examined block of the combined signal becomes limited in respect of the power or amplitude.

2. A method according to claim 1 wherein all channelization codes that have the same pre-determined spreading factors are used in decorrelation.

3. A method according to claim 1, wherein decorrelation is performed by calculating an input for vectors using the block where the threshold value was exceeded and a predetermined number of channelization codes.

4. A method according to claim 1, wherein the set objective is not to exceed the maximum value limit of the peak code domain error according to the standard of the telecommunications system used.

5. A method according to claim 1, wherein the set objective is to keep the channelization codes orthogonal.

6. A method according to claim 1, wherein the set objective is not to exceed the error vector magnitude according to the standard of the telecommunications system used.

7. A method according to claim 1, wherein normalization is performed by dividing the decorrelation result by the spreading factor of the channelization code.

8. A method according to claim 1, wherein the first and second weighting coefficients of the combined signal are defined for the codes.

9. A method according to claim 1, wherein the first and second weighting coefficients of the combined signal are defined for the code groups.

10. A method of limiting a combined signal, the method comprising:
    multiplying an information signal intended for each subscriber terminal by a spreading code and a weighting coefficient, which is proportional to the power of the transmission directed to the subscriber terminal;
    combining transmissions intended for various subscriber terminals into a combined signal;
    setting a threshold value for the power or amplitude values of the combined signal;
    dividing a chip sequence of the combined signal into blocks;
    comparing the power or amplitude values of each block with the set threshold value to find out whether the combined signal needs to be limited; and
    when the threshold values is exceeded,
        forming a residual signal;
        searching for channelization codes that are unused at a given time; and
        decorrelating the residual signal and the unused channelization codes to determine weighting coefficients;
    forming an estimate of the residual signal by means of the unused channelization codes, the weighting coefficients and one or more vectors selected from the sum vectors corresponding to the unused channelization codes;
    forming a clipped signal by subtracting the estimate of the residual signal from the combined signal of the examined block, and thus the examined block of the combined signal becomes limited in respect of the power or amplitude.

11. A method according to claim 10, wherein the combined signal is divided into chip blocks whose length is the same as the spreading factor of the channelization code.

12. A method according to claim 10, wherein the threshold value is determined so that the desired peak-to-mean ratio of the power or amplitude is achieved.

13. A method according to claim 10, wherein a signal to be added to the combined signal is an orthogonal signal.

14. A method according to claim 10, wherein the unused codes are searched for by decorrelating the combined signal and the channelization codes and by normalizing the decorrelation result by dividing it by the channelization code length.

15. A method according to claim 10, wherein a signal to be added to the combined signal is a non-orthogonal signal.

16. A method according to claim 10, wherein the residual signal is formed by determining a residual value for each chip of a block as follows: if the chip value is greater than the threshold value, the threshold value is subtracted from the chip and the result of this subtraction is the residual value; if the absolute value of the chip at most equals to the threshold value, the residual value is zero; if the chip value is lower than the negation of the threshold value, the threshold value is added to the chip value and the result of this addition is the residual value.

17. A method according to claim 10, wherein the estimate of the residual signal is formed by multiplying each unused channelization code and the corresponding weighting factor and by adding up the products obtained.

18. A method according to claim 10, wherein the estimate of the residual signal is formed by first determining a partial estimate by multiplying each unused channelization code and the corresponding weighting coefficient to obtain an input vector and by adding the selected sum vector to the input vector obtained, after which the partial estimates that were determined are added up.

19. A method according to claim 10, wherein the residual signal is formed by determining a residual value for each chip of the block as follows: if the chip value is at least zero, the standard deviation of the combined signal is subtracted from the chip value and the result of this subtraction is the residual value; if the chip value is lower than zero, the standard deviation of the combined signal is added to the chip value and the result of this addition is the residual value.

20. A method according to claim 10, wherein the sum vector is selected so that all elements are zeroes.

21. A method according to claim 10, wherein the sum vector is selected so that the sum vector comprises at least one element that is different from zero.

22. A transmitter of a radio telecommunications system where a combined signal is limited and an information signal intended for each subscriber terminal is multiplied by a spreading factor and a weighting coefficient, which is proportional to the power of the transmission directed to the subscriber terminal, and transmissions directed to several different subscriber terminals are combined into a combined signal, the transmitter comprising:
  a setting unit configured to set a threshold value for the power or amplitude values of the combined signal;
  a dividing unit configured to divide the chip sequence of the combined signal into blocks;
  a comparing unit configured to compare the power or amplitude values of each block with the set threshold value to find out whether the combined signal needs to be limited;
  a decorrelating unit configured to decorrelate the block where the threshold value was exceeded and a pre-determined number of channelization codes, which have a pre-determined spreading factor, and for performing normalization to determine first weighting coefficients for the channelization codes or channelization code groups, the first weighting coefficients being proportional to the power of the transmissions directed to pre-determined subscriber terminals;
  a second comparing unit configured to compare each combination of a first weighting coefficient and a related channelization code with set objectives and for determining second weighting coefficients for downlink transmissions selected as a result of the comparison, the second weighting coefficients being proportional to the power of the transmissions directed to pre-determined subscriber terminals; and
  a re-forming unit configured to re-form the block using combinations of the channelization codes and the weighting coefficients that were determined, the weighting coefficients being second weighting coefficients provided that they have been determined, or otherwise first weighting coefficients, and thus the examined block of the combined signal becomes limited in respect of the power or amplitude.

23. A transmitter according to claim 22, wherein all channelization codes that have the same pre-determined spreading factors are used in decorrelation.

24. A transmitter according to claim 22, wherein decorrelation is performed by calculating an input for vectors using the block where the threshold value was exceeded and a pre-determined number of channelization codes.

25. A transmitter according to claim 22, wherein the combined signal is divided into chip blocks whose length is the same as the spreading factor of the channelization code.

26. A transmitter according to claim 22, wherein the set objective is not to exceed the maximum value limit of the peak code domain error according to the standard of the telecommunications system used.

27. A transmitter according to claim 22, wherein the set objective is to keep the channelization codes orthogonal.

28. A transmitter according to claim 22, wherein the set objective is not to exceed the error vector magnitude according to the standard of the telecommunications system used.

29. A transmitter according to claim 22, wherein the threshold value is determined so that the desired peak-to-mean ratio of the power or amplitude is achieved.

30. A transmitter according to claim 22 wherein normalization is performed by dividing the decorrelation result by the spreading factor of the channelization code.

31. A transmitter according to claim 22, wherein the first and second weighting coefficients of the combined signal are determined for the codes.

32. A transmitter according to claim 22, wherein the first and second weighting coefficients of the combined signal are determined for the code groups.

33. A transmitter of a radio telecommunications system where a combined signal is limited and an information signal intended for each subscriber terminal is multiplied by a spreading factor and a weighting coefficient, which is proportional to the power of the transmission directed to the subscriber terminal, and transmissions directed to several different subscriber terminals are combined into a combined signal, the transmitter comprising:
  a setting unit configured to set a threshold value for the power or amplitude values of the combined signal;
  a dividing unit configured to divide the chip sequence of the combined signal into blocks;
  a comparing unit configured to compare the power or amplitude values of each block with the set threshold value to find out whether the combined signal needs to be limited;
  a forming unit configured to form a residual signal;
  a searching unit configured to search for the channelization codes that are unused at a given time and for decorrelating the residual signal and the unused channelization codes to determine weighting coefficients;

a selecting unit configured to select one or more desired vectors from the sum vectors corresponding to the unused channelization codes;

an estimating unit configured to form an estimate of the combined signal by means of the unused channelization codes and the selected one or more sum vectors;

a second forming unit configured to form a clipped signal by subtracting the estimate of the residual signal from the combined signal of the examined block, and thus the examined block of the combined signal becomes limited in respect of the power or amplitude.

34. A transmitter according to claim 33, wherein a signal to be added to the combined signal is an orthogonal signal.

35. A transmitter according to claim 33, wherein the unused codes are searched for by decorrelating the combined signal and the channelization codes and by normalizing the decorrelation result by dividing it by the channelization code length.

36. A transmitter according to claim 33, wherein the residual signal is formed by determining a residual value for each chip of a block as follows: if the chip value is greater than the threshold value, the threshold value is subtracted from the chip and the result of this subtraction is the residual value; if the absolute value of the chip at most equals to the threshold value, the residual value is zero; if the chip value is lower than the negation of the threshold value, the threshold value is added to the chip value and the result of this addition is the residual value.

37. A transmitter according to claim 33, wherein the estimate of the residual signal is formed by multiplying each unused channelization code and the corresponding weighting factor and by adding up the products obtained.

38. A transmitter according to claim 33, wherein the estimate of the residual signal is formed by first determining a partial estimate by multiplying each unused channelization code and the corresponding weighting coefficient to obtain an input vector and by adding the selected sum vector to the input vector obtained, after which the partial estimates that were determined are added up.

39. A method according to claim 33, wherein the residual signal is formed by determining a residual value for each chip of the block as follows: if the chip value is at least zero, the standard deviation of the combined signal is subtracted from the chip value and the result of this subtraction is the residual value; if the chip value is lower than zero, the standard deviation of the combined signal is added to the chip value and the result of this addition is the residual value.

40. A transmitter according to claim 33, wherein all elements of the selected sum vector are zeroes.

41. A transmitter according to claim 33, wherein each selected sum vector includes at least one element that is different from zero.

42. A transmitter according to claim 33, wherein the signal to be added to the combined signal is a non-orthogonal signal.

43. A transmitter of a radio telecommunications system where a combined signal is limited and an information signal intended for each subscriber terminal is multiplied by a spreading factor and a weighting coefficient, which is proportional to the power of the transmission directed to the subscriber terminal, and transmissions directed to several different subscriber terminals are combined into a combined signal, the transmitter comprising:

means for setting a threshold value for the power or amplitude values of the combined signal, means for dividing the chip sequence of the combined signal into blocks, means for comparing the values of each block with the set threshold value to find out whether the combined signal needs to be limited, means for decorrelating the block where the threshold value was exceeded and a pre-determined number of channelization codes, which have a pre-determined spreading factor, and for performing normalization to determine first weighting coefficients for the channelization codes or channelization code groups, the first weighting coefficients being proportional to the power of the transmissions directed to pre-determined subscriber terminals, means for comparing each combination of a first weighting coefficient and a related channelization code with the set objectives and for determining second weighting coefficients for downlink transmissions selected as a result of the comparison, the second weighting coefficients being proportional to the power of the transmissions directed to pre-determined subscriber terminals, means for re-forming the examined block using combinations of the channelization codes and the weighting coefficients that were determined, the weighting coefficients being second weighting coefficients provided that they have been determined, or otherwise first weighting coefficients, and thus the examined block of the combined signal becomes limited in respect of the power or amplitude.

44. A transmitter of a radio telecommunications system where a combined signal is limited and an information signal intended for each subscriber terminal is multiplied by a spreading factor and a weighting coefficient, which is proportional to the power of the transmission directed to the subscriber terminal, and transmissions directed to several different subscriber terminals are combined into a combined signal, the transmitter comprising:

means for setting a threshold value for the power or amplitude values of the combined signal, means for dividing the chip sequence of the combined signal into blocks, means for comparing the values of each block with the set threshold value to find out whether the combined signal needs to be limited, means for forming a residual signal, means for searching for the channelization codes that are unused at a given time and for decorrelating the residual signal and the unused channelization codes to determine weighting coefficients, means for selecting one or more desired vectors from the sum vectors corresponding to the unused channelization codes, means for forming an estimate of the combined signal by means of the unused channelization codes and the selected one or more sum vectors, means for forming a clipped signal by subtracting the estimate of the residual signal from the combined signal of the examined block, and thus the examined block of the combined signal becomes limited in respect of the power or amplitude.

* * * * *